United States Patent [19]
Smith et al.

[11] Patent Number: 6,085,164
[45] Date of Patent: *Jul. 4, 2000

[54] APPARATUS AND METHOD OF ALLOCATING FLIGHT INVENTORY RESOURCES BASED ON THE CURRENT MARKET VALUE

[75] Inventors: Barry Craig Smith, Flower Mound; Vinod Balakrishnan, Colleyville; Richard Wenman Pennefather Green, Dallas, all of Tex.

[73] Assignee: Sabre Inc., Fort Worth, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,468

[22] Filed: Mar. 4, 1997

Related U.S. Application Data

[63] Continuation of application No. 08/688,554, Jul. 30, 1996, abandoned, which is a continuation of application No. 08/120,800, Sep. 15, 1993, abandoned.

[51] Int. Cl.[7] .................................................. G06F 17/60
[52] U.S. Cl. ..................................... 705/5; 705/6; 705/10
[58] Field of Search ................................. 705/3, 5, 6, 8, 705/10; 340/825.28, 825.29; 709/200, 216, 217, 218, 227, 219; 707/2, 3, 4, 5, 9, 10

[56] References Cited

U.S. PATENT DOCUMENTS

| | | |
|---|---|---|
| 4,775,936 | 10/1988 | Jung . |
| 5,255,184 | 10/1993 | Hornick et al. . |
| 5,262,942 | 11/1993 | Earle . |
| 5,270,921 | 12/1993 | Hornick . |
| 5,369,570 | 11/1994 | Parad . |

OTHER PUBLICATIONS

Belobaba, Application of a Probabilistic Decision Model to Airline Seat Inventory Control, Operations Research, vol. 37, No. 2, pp. 183–197, Apr. 1989.

Feldman, Joan, "What's a revenue manager to do?", Air Transport World, vol. 30, No. 8, pp. 78–79, Aug. 1993.

Anonymous, "Control Data's Optix helps airlines to maximize discount yields. (software package)", Travel Weekly, vol. 46, p. 27, Aug. 31, 1987.

*Primary Examiner*—Paul R. Lintz
*Assistant Examiner*—Alexander Kalinowski
*Attorney, Agent, or Firm*—Finnegan, Henderson, Farabow, Garrett & Dunner, L.L.P.

[57] ABSTRACT

The present invention relates to an inventory control method and architecture that maximizes revenues derived from the sale of a given inventory resource to a customer. More particularly, the present invention uses a continuous nested execution environment that allows a determination of a minimum acceptable price by continuously computing an optimal sale price based on current demand and supply and expected cancellations. The method described accesses a centrally located information repository and retrieves an inventory resource type and value allowing requests below the minimum acceptable price to be rejected, while requests above the minimum acceptable price can be accepted thus allowing the resource provider to maximize incoming revenues from the sale of its inventory of reservations.

22 Claims, 7 Drawing Sheets

APPARATUS AND METHOD OF ALLOCATING FLIGHT INVENTORY RESOURCES BASED ON THE CURRENT MARKET VALUE

This application is a continuation of application Ser. No. 08/688,554 filed Jul. 30, 1996, now abandoned, which is a continuation of application Ser. No. 08/120,800 filed Sep. 15, 1993 abandoned Mar. 27, 1997.

TECHNICAL FIELD

The invention relates to an inventory control method and architecture for maximizing revenues derived from the sale of a given inventory resource to a customer. In particular, the present invention comprises a method and architecture of accessing availability information on a computer system and continuously computing a new minimum acceptable price for a given itinerary based on the current market value of the itinerary, thus allowing the resource provider to maximize incoming revenues from the sale of its inventory of reservations.

BACKGROUND OF THE INVENTION

Growth in the transportation business and, in particular, the airline industry has resulted in the increased use of central reservation host computers for managing flights, scheduling, and fare information on a real-time request basis. In past systems, the host computer response to customer requests has employed a method and architecture of accessing available inventory of flights stored on a central reservation database and categorizing them by a numerical driven scheme. Examples of such prior methods and architectures include systems such as American Airlines, Inc., SABRE, EDS', System One, Covia, World Span, and other similar reservation systems. While these prior systems have been effective in prioritizing available inventory flight segments by such factors as class and seating availability the prior systems fail to prioritize available inventory flight segments by the current market value of the inventory flight segment.

Nor can prior systems determine the correct market value by using the customer itinerary as can the present invention.

Additionally, present systems fail to adjust the value of an inventory element by increasing fare prices when demand is high or decreasing prices when demand is low.

The current market value is determined by the present demand and supply as well as the forecasted future demand and supply of the inventory element. Consideration of the current market value allows the resource provider to maximize revenues by determining the current demand, current average market value, and current available supply for a given inventory element.

Thus, the present invention, a method and architecture that accesses existing central database systems and prioritizes inventory elements by the current market value is a decided advantage over prior systems.

SUMMARY OF THE INVENTION

The method and architecture disclosed herein provide a means for accessing a centrally located information repository and retrieving inventory resource type and value information in a continuous nesting environment that allows a determination of a minimum acceptable price for a given inventory resource. Customer requests below the minimum acceptable price are rejected, while requests above the minimum acceptable price are accepted if an available inventory resource fulfilling the customer's request criteria is available.

Overbooking is used to permit selling a greater number of requests than available inventory resources thus optimizing the allocation of the inventory segments. Forecasts of future demand and supply for inventory resources is also performed and used to adjust the value of a given inventory resource. A historical repository of past inventory resource allocations is maintained and used to avoid congestion and decrease computing load of the centrally located information repository host computer.

Thus, one aspect of the present invention is to provide a continuous nested execution environment that maximizes revenues derived from the sale of an inventory resource or group of inventory resources by computing an optimal sale price based on current demand for the inventory, current supply of the inventory, expected cancellations and other factors bearing on the marketability of the inventory.

Another aspect of the present invention is to work cohesively with existing reservation systems without overloading or increasing data traffic so as to avoid negatively impacting overall system performance. Cohesiveness is accomplished by using and maintaining a local information repository database to limit access to the central reservations system repository databases.

Another aspect of the present invention is to provide a feature for predicting future sales as well as allocation activity to allow the local inventory manager to plan for personnel requirements, short term marketing plans, acceptance of short term inventory group requests and other factors that assist the local inventory manager to maximize efficiency of the related inventory management tasks.

Another aspect of the present invention is to control the allocation of a group of inventory resources by determining a minimum acceptable price for a requested number group of inventory resources as compared to expected revenues associated with accepting requests on an individual request basis.

BRIEF DESCRIPTION OF THE DRAWINGS

For a more complete understanding of the present invention and the advantages thereof, reference is now made to the following description in conjunction with the accompanying drawings in which.

DETAILED DESCRIPTION OF THE INVENTION

Figure 1:
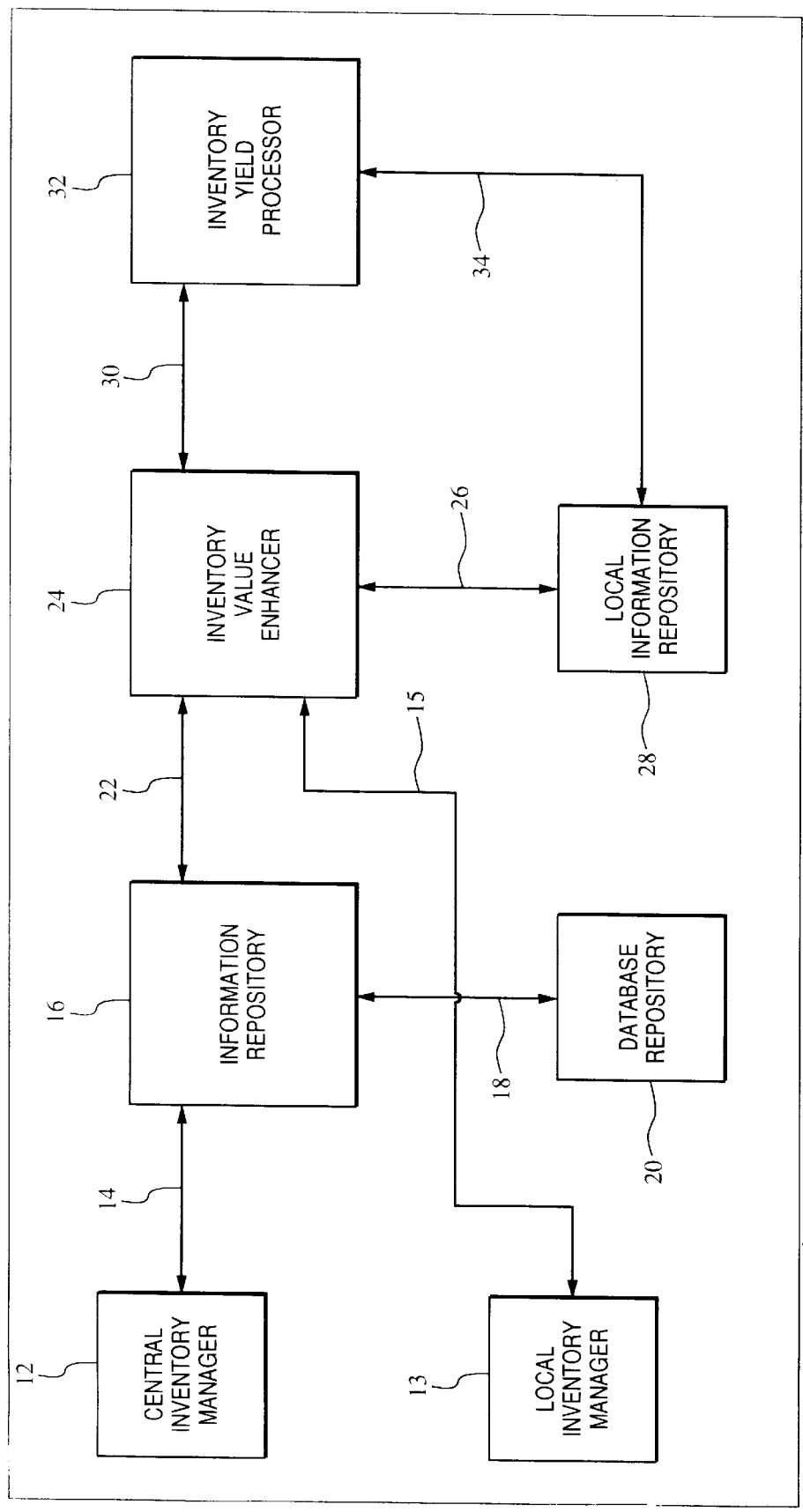
FIG. 1 is a block diagram of one embodiment of the architecture in accordance with the present invention.

The present invention relates to a method and architecture for controlling inventory resources which can be more readily understood by reference to system 10 of FIG. 1. As can be seen system 10 has a central inventory manager 12 which allows a user to edit, view, retrieve, input and perform other management functions on the data stored in the centrally located information repository 16. The central inventory manager 12 is communicably attached to information repository 16 via communications means 14 to allow the exchange of data.

In one preferred embodiment of the present invention the information repository 16 is one or more of several central reservation systems such as American Airlines, Inc., SABRE, EDS', System One, Covia, World Span, or any other similar central reservation system. The central information repository 16 contains the inventory resource database and is communicably attached to a historical database repository 20 via communications means 18. The historical database repository 20 contains inventory resource transaction records which are updated on a periodic maintenance cycle.

The information repository 16 is communicably attached to an inventory value enhancer 24 via communications means 22. The inventory value enhancer 24 provides a mechanism for continuously upgrading the value of an inventory resource and provides a means to maximize revenues from the allocation of inventory resources to a specific customer type. The inventory value enhancer 24 also provides a dynamic inventory control mechanism for computing an optimal value of an inventory resource as a function of the current available supply of inventory and other history-based allocation activity as reported by the information repository 16 via communications means 22.

A local inventory manager 13 is communicably attached to the inventory value enhancer 24 via communications means 15 to allow customer requests for inventory resources to be received by the centrally located information repository 16. The inventory value enhancer 24 is communicably attached to an inventory yield processor 32 via communications means 30.

Use of the inventory value enhancer 24 does not interrupt or otherwise impede performance of the inventory yield processor 32. It should be clearly understood that the inventory yield processor 32 can indirectly communicate to the centrally located information repository 16 by operation of an 'OR' function between the inventory value enhancer 24 and the inventory yield processor 32. The inventory value enhancer 24 and the inventory yield processor 32 are communicably attached to the local information repository 28 via communications means 26 and 34, respectively. Local information repository 28 contains a history of past inventory resource allocation transactions thus limiting the necessity for direct access to the centrally 5 located information repository 16.

The inventory value enhancer 24, inventory yield processor 32, and local information repository 28 perform the inventory resource allocation functions of system 10.

Figure 2:
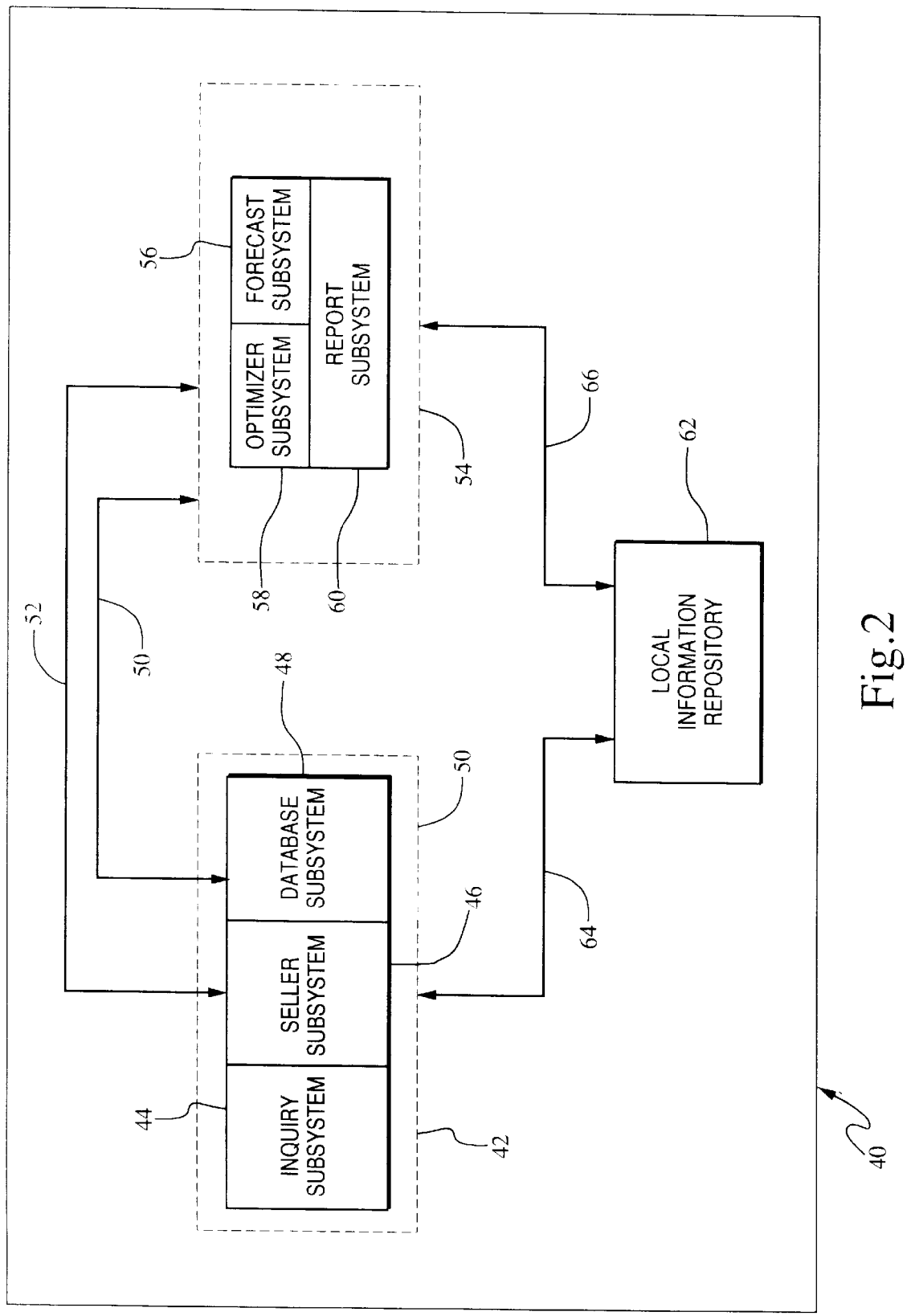
FIG. 2 is a detailed block diagram of the inventory allocator subsystem in accordance with the present invention.

FIG. 2 shows inventory resource allocator 40 which in one preferred embodiment is maintained on a UNIX-based or equivalent computer platform.

The inventory resource allocator 40 consists of an inventory value enhancer 42, an inventory yield processor 54 and a local information repository 62 all communicably attached along links 50, 52, 64 and 66. The inventory value enhancer 42 comprises an inquiry subsystem 44, seller subsystem 46 and database subsystem 48. The inventory value enhancer 42 receives inventory resource type and value information from at least one centrally located information repository 16 (FIG. 1). The inventory value enhancer 42 is also capable of receiving type and value information from a plurality of centrally located information repositories 16 providing the customer with a maximum number of inventory resource preferences.

The Seller subsystem 46 receives inputs from the database subsystem 48 and inquiry subsystem 44, allowing the inventory value enhancer 42 to perform a optimization valuation function that increases the value of available inventory resources.

The Seller subsystem 46 is communicably attached to the inventory yield processor 54 via communications means 52 to allow an exchange of inventory value information.

The inventory yield processor 54 comprises a forecast subsystem 56, optimizer subsystem 58 and report subsystem 60 which operate to perform a preliminary inventory valuation function.

In addition, the database subsystem 48 is communicably attached to the inventory yield processor 54 via communications means 50 to allow an exchange of past inventory allocation information. The inventory value enhancer 42 and inventory yield processor 54 are communicably attached to a local information repository 62 via communications means 64 and 66, respectively. Information exchanges with the local information repository 62 limit access to the centrally located information repository 16 (FIG. 1) which decreases overloading and other data traffic problems. The database subsystem 48 maintains the database structure of the local information repository 62 by periodically updating the inventory allocation information.

Figure 3:
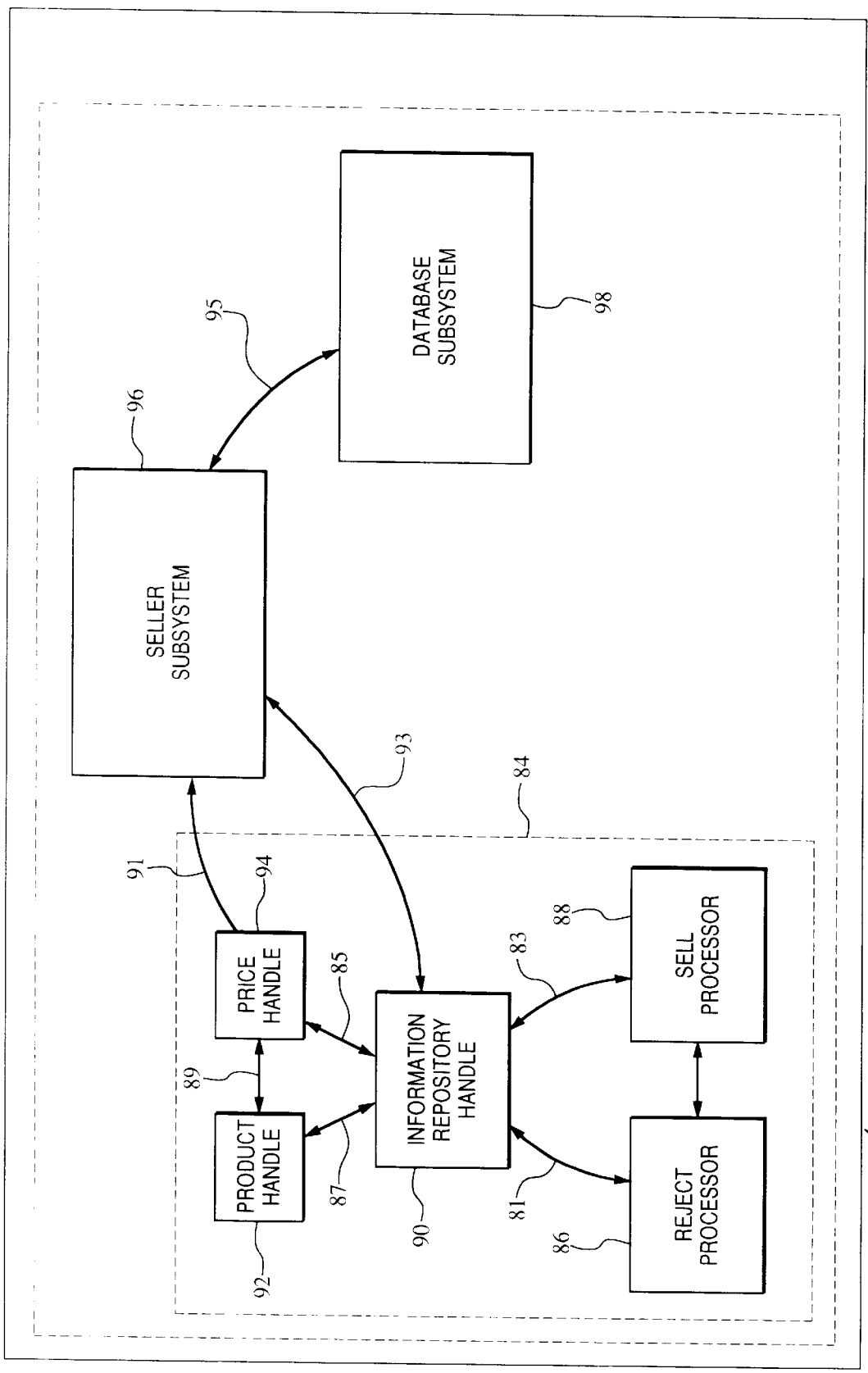
FIG. 3 is a detailed block diagram of the inventory value enhancer in accordance with the present invention.

The operation of the inventory value enhancer 42 can be more readily understood with reference to FIG. 3. FIG. 3 show the inventory value enhancer 80 comprising an inquiry subsystem 84, seller subsystem 96 and database subsystem 98. The inquiry subsystem 84 further comprises a reject processor 86, sell processor 88, information repository handler 90, product handler 92, and price handler 94. The elements 84, 86, 88, 90, 92 and 94 are communicably connected along communications links 81, 83, 85, 87 and 89, respectively.

The sell processor 88 executes a sales strategy program which conforms to a specified organization policy regulating inventory resource allocation. The reject processor 86 prevents allocation of inventory resources for customer requests failing to comply with the organization's policy. The product handler 92 and price handler 94 are used by inquiry subsystem 84 to obtain inventory type and value information from both the centrally located information repository 16 (FIG. 1) and the local information repository 62 (FIG. 2).

The inquiry subsystem 84 executes in a continuous manner to optimize the inventory value and communicates with the seller subsystem 96 along communications links 91 and 93, which receives the new value information before allocating the inventory to the customer. This continuous activity is performed in a nested-loop environment which calculates present inventory value based on such market factors as current inventory allocation, a forecast of remaining inventory demand, variation in remaining inventory demand, and remaining unallocated inventories. Thus, the value assigned by the inventory value enhancer 80 to a given inventory resource is optimized at any given time before being allocated by the seller subsystem 96.

The historical database subsystem 98 is used to obtain much of the current market factors used to determine present inventory value and to limit access to the centrally located information repository 16 (FIG. 1). While the market factors herein disclosed are used in one of the preferred embodiments, it should be readily understood that other market factors pertaining to present inventory value are contemplated and within the scope of the present invention.

The method of controlling inventory resources of the present invention is set forth in detail in FIGS. 4–7.

Figure 4:
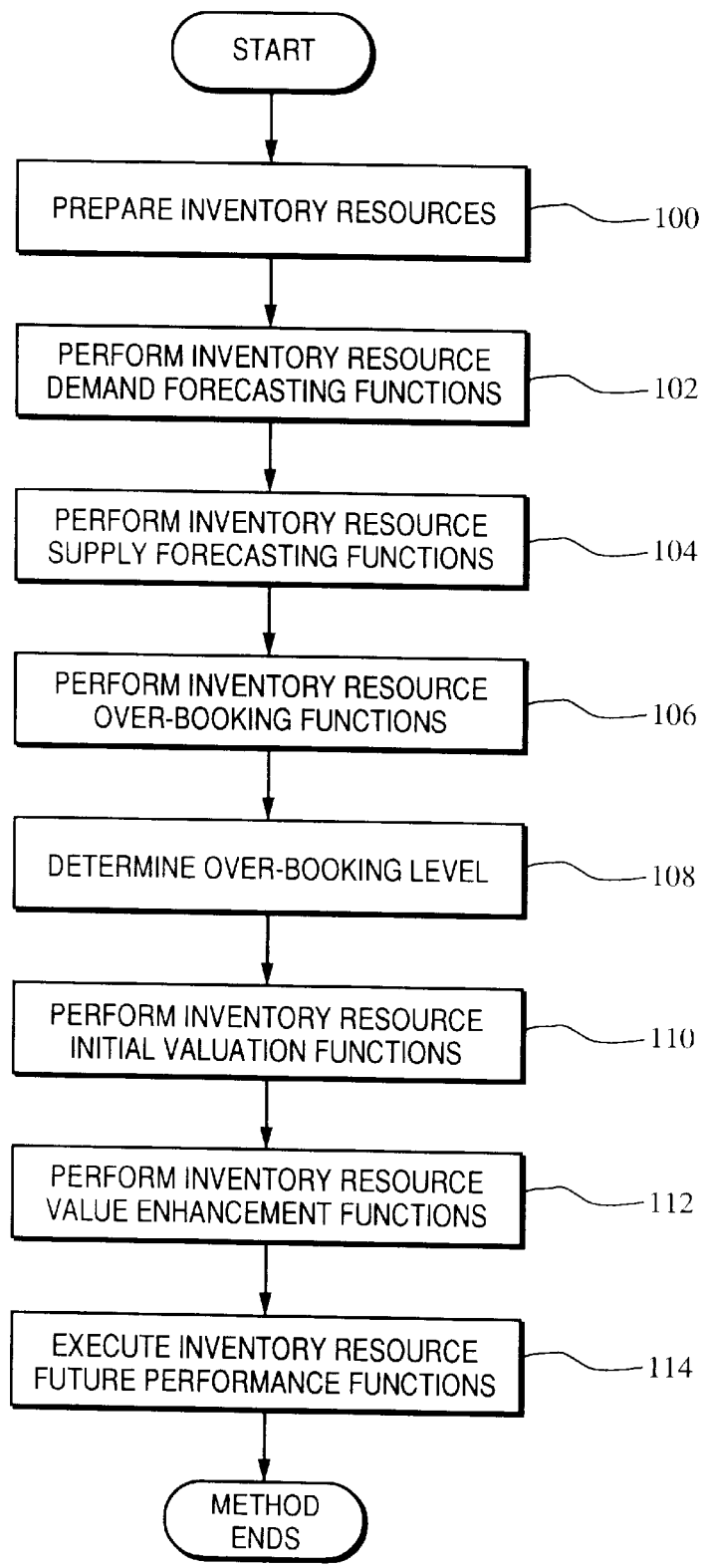
FIG. 4 is flow diagram of one embodiment of the method used to control inventory resources of the present invention.

As indicated in FIG. 4, the process starts with the preparation of the existing inventory resources, step 100. This step is performed by the local inventory manager 13 (FIG. 1) who is familiar with inventory types, classes, prices, time classes, priorities and other characteristics which determine how an organization's inventory resources are allocated to the customer.

Process flow is subsequently directed to the inventory resource demand forecasting functions, step 102, which involve determining individual demand, walkup demand and group demand for unallocated inventory resources. Process flow continues to the inventory resource supply forecasting functions, step 104, to determine the effective transient supply of inventory resources available for allocation. Step 104 uses fluctuation in available inventory resources, inventory resources reserved for groups' cancellations, no-shows, and other nonuse of inventory resources.

Process flow for the method used to control inventory resources of the present invention is then directed to the inventory resource overbooking functions, step 106. The overbooking process 106 is designed to accept a greater number of customer requests for allocations than the number of existing inventory resources by forecasting the expected number of inventory resources which will not be used by the customer due to cancellations, no-shows, and other nonuse.

The process flow is then directed to determining an overbooking level, step 108, which allows unused inventory resources due to nonuse to be converted to inventory resources available for future allocation. Step 108 is used in conjunction with inventory resource value enhancement functions, step 112, to determine the optimal value of currently available inventory resources as performed by the forecaster subsystem 56 (FIG. 2) and optimizer subsystem 58 (FIG. 2) as herein disclosed.

Subsequently an initial valuation of the inventory resources, step 110, occurs which determines an optimum value for a given inventory resource. The initial valuation step 110 uses inventory resource classes, price classes, and itinerary, and any other characteristics which determine how an organization's inventory resources are allocated to the customer to maximize expected revenues using a probabilistically forecasted customer demand for inventory resources. The initial valuation 110 also performs an upsell function to probabilistically determine the number of higher valued inventory resources requested by customers who are rejected by the lower valued inventory resource.

Next, inventory resource value enhancement functions, step 112 provides a dynamic inventory resource control mechanism allowing reoptimization in real time to compute new inventory values based on the latest allocation activity as reported by the centrally located information repository 16 (FIG. 1). Step 112 considers the increases in allocation activity and/or inventory cancellations, no-shows and other nonuse to either raise or lower the inventory value, respectively. Step 112 is triggered when request information along communications means 22 (FIG. 1) to inventory resource allocator 40 (FIG. 1) from the centrally located information repository 16 appears (FIG. 1). The request information typically consists of an inventory resource query, reservation, allocation, cancellation, or modification but it should be readily understood that other suitable requests for information that impact the present available supply of inventory resources is contemplated and within the scope of the present invention. In addition, step 112 can be performed automatically as part of a nightly batch cycle or invoked by the local inventory manager.

Inventory resource future performance functions, step 114 uses allocation activity found on the centrally located information repository 16 to achieve projections of future available demand for inventory resources. Inventory resource future performance determines expected future allocations, expected future individual utilization of inventory resources, expected future revenues to be derived from allocation of inventory resources, and other factors that allow the local inventory manager to take preparatory action to handle future inventory allocations.

In the preferred embodiment of the present invention, the method disclosed herein for controlling inventory is used in conjunction with a centrally located inventory repository 16 (FIG. 1) that supports a continuous nested environment. The method disclosed, however, can be used in non-nested environments by translating the results obtained through nesting execution of the process herein disclosed into a set of restrictions that can be used to approximate the optimal value of a given inventory resource in non-nested information repositories.

In addition, the method for controlling inventory resource as herein disclosed can be used in conjunction with a request for grouped inventory resources by evaluating the value of the allocated group as requested by the customer versus the value of allocating the individual component inventory resources before accepting the request.

Figure 5:
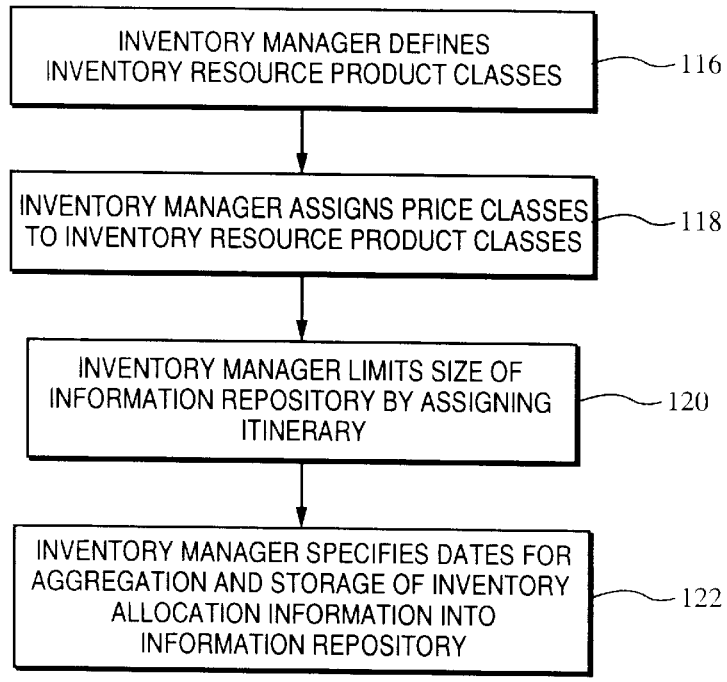
FIG. 5 is a flow diagram of one embodiment of the inventory resource preparation method of the present invention.

The process of preparing the inventory resources can be more readily understood and described with reference to FIG. 5. In FIG. 5, the process begins with the central inventory manager 12 (FIG. 1) defining inventory resource classes, step 116, which involves grouping similar inventory resources to form discernable classes which the customer recognizes as being distinct or different. The process is then directed to assigning price classes, step 118, where price classes are defined by the organization's policy governing price plans, programs and other aspects of the organization's product offerings. Process flow is then directed to limiting the size of centrally located information repository 16 by designating the itinerary, step 120, to set periods at which a given inventory resource is available for allocation. Finally, the step of specifying reading days, step 122, for aggregating and storing inventory allocation information on database repository 20 occurs.

Figure 6:
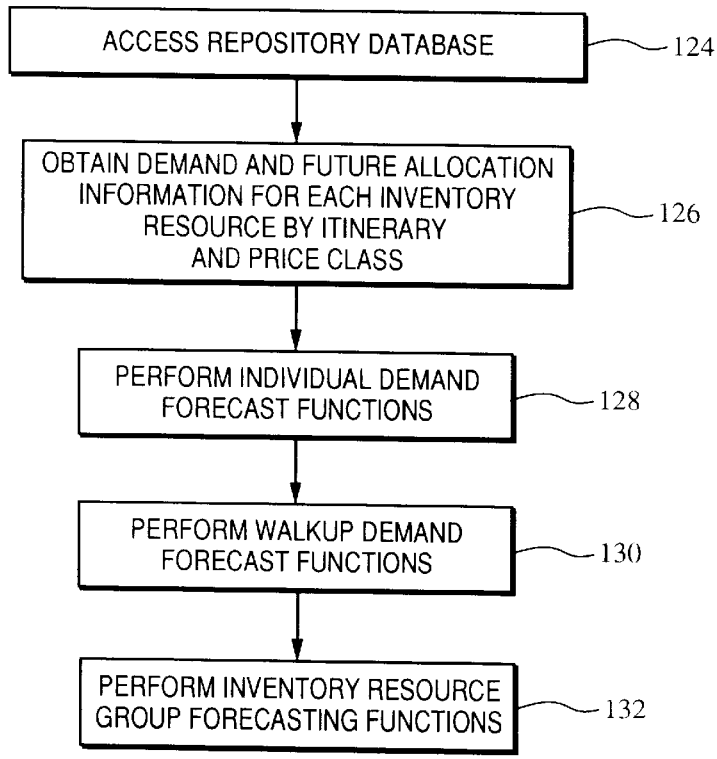
FIG. 6 is a flow diagram of the inventory resource forecasting method of the present invention.

The inventory resource forecasting functions of step 102 (FIG. 4) can be more readily understood and described with reference to FIG. 6. Access to a database repository 20 (FIG. 1) and local information repository 62 (FIG. 2) is established, step 124, to obtain demand and other allocation information for each inventory resource class, price class, itinerary and other characteristics which determine how the organization's inventory resources are allocated to the customer, step 126. The allocation information is used to perform individual demand forecast functions, step 128. Forecasting functions 102 (FIG. 4) also involves performing demand forecast functions 130 which prioritizes the higher valued inventory resources for allocation to walkup customers. In addition, demand forecasting 130 is capable of forecasting group allocations of inventory resources 132.

Figure 7:
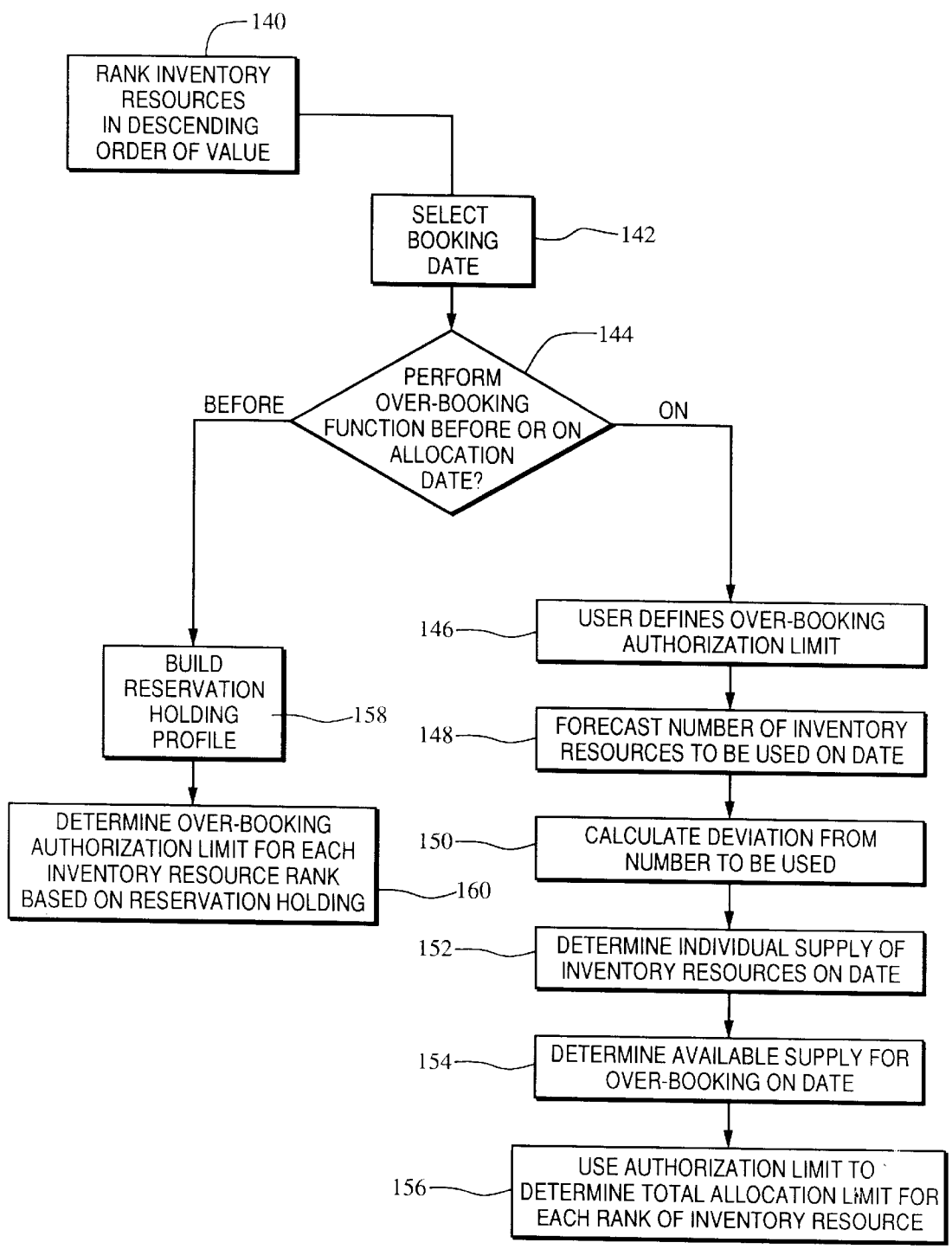
FIG. 7 is a flow diagram of the inventory resource overlooking method of the present invention.

The inventory resource overbooking functions of step 106 (FIG. 4) can be more readily understood and described with reference to FIG. 7. The overbooking process begins by ranking inventory resource in a descending order of value, step 140. Subsequently, selection of an allocation date, step 142, occurs to select overbooking prior to a date when the customer receives an inventory resource or on the actual date of usage, step 144. Allocations on the actual date of reception are directed to step 146, where the user defines an overbooking authorization limit as the upper bound of total allocations to be made. A weighted average of actual inventory resources delivered to the customer determined by accessing the past allocation database repository 20 (FIG. 1) and the local information repository 62 (FIG. 2) is performed in order to forecast the actual number of inventory resources to be requested on the selected allocation date 142, step 148. Next, a standard deviation of inventory resources to be requested is performed, step 150 and the amount of individual supply of inventory resources on selected allocation date 142 is calculated, step 152, to account for the total number of inventory resources available minus the inventory resources already requested by customers.

Process flow continues to a determination of the available supply for allocation on the selected date, step 154 which is equal to the supply of inventory resources minus the amount of inventory resources already allocated to customers. The process of overbooking of the present invention, as herein disclosed, describes a process of continuously maximizing utilization of existing inventory resources by accepting a probabilistic greater number of requests for inventory than are available for allocation. Thus, accounting for request cancellations, no-shows, and other forms of inventory non-use.

Overbooking prior to the selected allocations date 142 begin by constructing a reservations holding profile, step 158, to compensate for early cancellations, no-shows and other nonuse which cannot be replaced with new requests. The reservations holding profile contains information of past cancellations for each inventory classes, price classes, itinerary, and other characteristics which determine how the organization's inventory resources are allocated to the customer. Based on the reservations holding profile, an overbooking authorization limit for each inventory resource is determined, step 160, for every day up to the selected allocation date.

Figure 8:
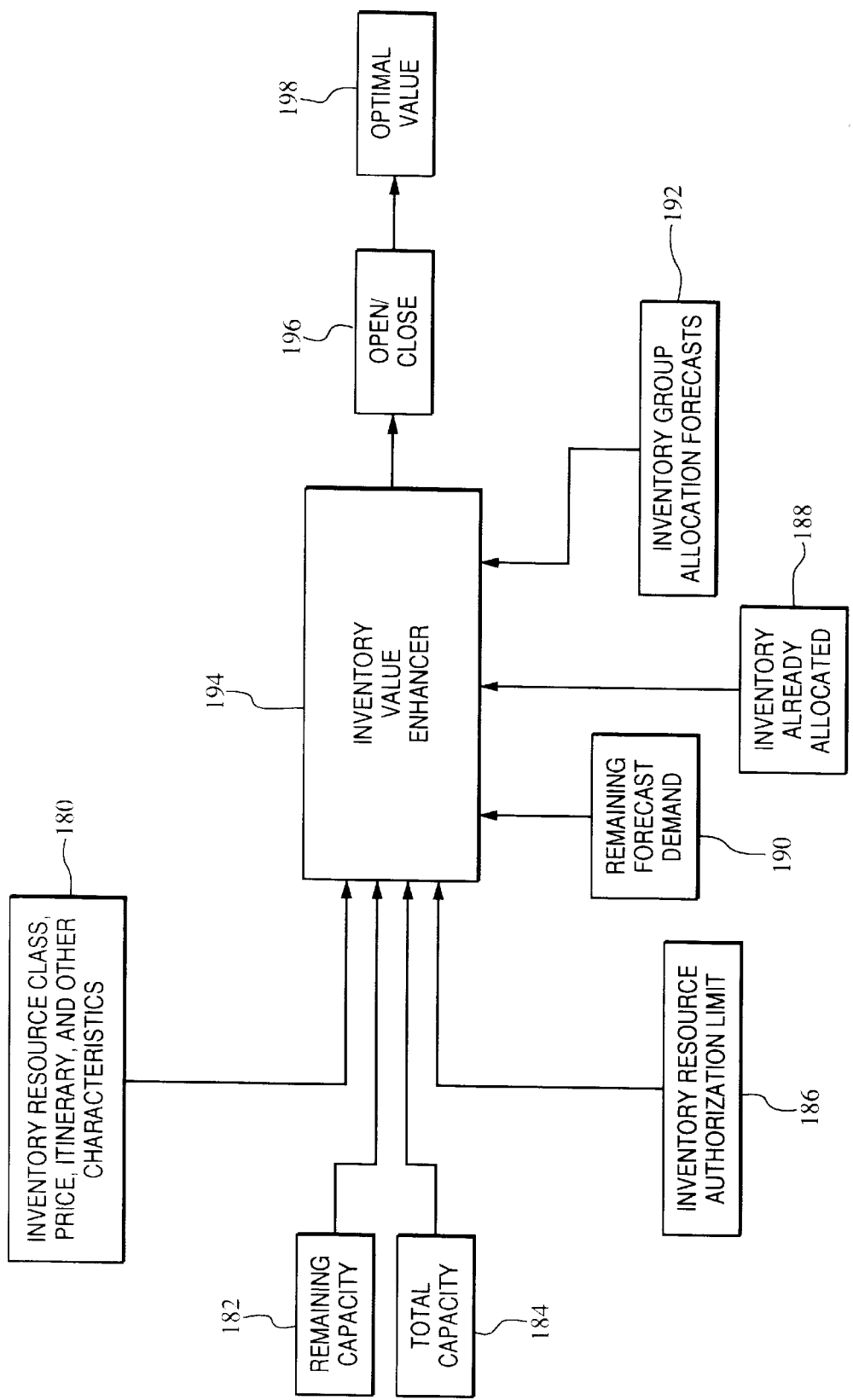
FIG. 8 is a input/output block diagram of the valuation function employed in the present invention.

The inventory value enhancement functions of step 112 (FIG. 4) can be more readily understood and described with reference to FIG. 8. The remaining capacity 182 for inventory resources and the remaining forecasted demand 190 are input into inventory value enhancer 194 by local inventory manager 13 (FIG. 1). Predefined inventory classes, price classes, itinerary, priorities and other characteristics which determine how an organization's inventory resources are allocated to the customer 180 are accessed by the inventory value enhancer 194. In addition, the inventory resources already allocated 188, inventory group allocation forecasts, and an inventory resource authorization limit 186 are determined by inventory value enhancer 194 and used in combination with other inputs 180, 182, 184, 186, 188, 190, and 192 to arrive at an optimal value 198 for each inventory resource type.

The valuation process also involves an open and close operation 196 that rejects requests for a lower valued inventory resource should demand for a higher valued inventory resource be at a predetermined level to maximize revenues. The valuation process as herein disclosed describes a process wherein the allocation of inventory resources is based on determining an optimal value for a given inventory resource based on current allocations, remaining demand, variation in remaining demand and remaining capacity in order to maximize revenues.

Modifications of this invention will occur to those skilled in this art. Therefore, it is to be understood that this invention is not limited to the particular method and architecture disclosed, but that it is intended to cover all modifications which are within the true spirit and scope of this invention as claimed.

We claim:

1. A system for determining whether to allocate a flight inventory resource, the system comprising:

a central information repository for storing current inventory data describing flight inventory resources currently available for allocation to a customer, wherein the inventory data includes a current market price for each flight inventory resource;

a local information repository for storing historical information on past market transactions of the flight inventory resources;

a flight inventory value enhancer, coupled to both the central information repository and the local information repository, for calculating the optimal market price of each flight inventory resource based on a set of factors selected from (1) the current market price for the flight inventory resource, (2) a number of allocated and unallocated flight inventory resources, (3) a forecast of demand for the unallocated flight inventory resources, and (4) a variation in the demand for unallocated flight inventory resources, wherein the flight inventory value enhancer determines the forecasted demand and the variation in demand based on the historical information stored in the local information repository; and a comparator configured to compare the stored current market price of the flight inventory resource with the calculated optimal market price to determine whether to allocate to the customer the flight inventory resource.

2. The system of claim 1 further comprising:

means for updating the current market price for each flight inventory resource stored in the central information repository; and means for receiving a request to purchase a flight inventory resource at the calculated optimal market value price.

3. The system of claim 1, wherein the central information repository comprises a commercial airline reservation system.

4. The system of claim 1, wherein the flight inventory value enhancer further includes:

means for periodically updating the local information repository with history data relating to flight inventory resource allocations since the last update time.

5. The system of claim 1, wherein the means for updating the current market price of the flight inventory resource operates in a continuous real time nested environment.

6. The system of claim 1, wherein the means for updating the current market price of the flight inventory resource operates periodically as part of a batch cycle.

7. The system of claim 1, further including:

a database for storing a count of allocated inventory resources that were cancelled or unused by customers to arrive at an overbooking level for the inventory resources; and means for accepting customer requests for the flight inventory resources, wherein the number of customer requests accepted is greater than the number of unallocated available inventory resources by the overbooking level.

8. The system of claim 1, wherein the central information repository allocates the flight inventory resource to the customer at the current market price.

9. The system of claim 1 further comprising:
means for allocating the flight inventory resource to the customer when the current market price is greater than the calculated optimum market price.

10. A computer-implemented method for determining whether to allocate a flight inventory resource, comprising:
storing current market prices for flight inventory resources;
storing historical information on past market transactions of the flight inventory resources;
determining allocated and unallocated flight inventory resources;
forecasting a demand for the unallocated flight inventory resources based on the stored historical information;
computing a variation in the demand for the unallocated flight inventory resources based on the stored historical information;
deriving an optimal market price for the flight inventory resources based on the forecasted demand and the computed variation in the demand for the unallocated flight inventory resources;
comparing the stored current market price of the flight inventory resource with the derived optimal market price; and
allocating the flight inventory resource to a customer based upon the comparison between the stored current market price of the flight inventory resource and the derived optimal market price.

11. The method of claim 10 further comprising the steps of:
updating the current market price for each flight inventory resource stored in the central information repository; and
receiving a request to purchase a flight inventory resource at the calculated optimal market value price.

12. The method of claim 10, wherein the allocating step further includes the substep of:
allocating the flight inventory resource to the customer at the current market price.

13. The method of claim 10, wherein the allocating step further includes the substep of:
allocating the flight inventory resource to the customer when the current market price is greater than the calculated optimum market price.

14. A system for determining whether to allocate a flight inventory resource, the system comprising:
a first information repository for storing current inventory data describing flight inventory resources currently available for allocation to a customer, wherein the inventory data includes a current market price for each flight inventory resource;
a second information repository for storing historical information on past market transactions of the flight inventory resources;
a flight inventory value enhancer, coupled to both the first information repository and the second information repository, for calculating the optimal market price of each flight inventory resource using a forecasted demand and a variation in demand, each determined from the historical information stored in the second information repository; and
a comparator configured to compare the stored current market price of the flight inventory resource with the calculated optimal market price to determine whether to allocate to the customer the flight inventory resource.

15. The system of claim 14, wherein the first information repository comprises a commercial airline reservation system.

16. The system of claim 14, wherein the flight inventory value enhancer further includes:
means for periodically updating the local information repository with history data relating to flight inventory resource allocations since the last update time.

17. The system of claim 14, further including:
a database for storing a count of allocated inventory resources that were canceled or unused by customers to arrive at an overbooking level for the inventory resources; and
means for accepting customer requests for the flight inventory resources, wherein the number of customer requests accepted is greater than the number of unallocated available inventory resources by the overbooking level.

18. The system of claim 14, wherein the first information repository allocates the flight inventory resource to the customer at the current market price.

19. The system of claim 14 further comprising:
means for allocating the flight inventory resource to the customer when the current market price is greater than the calculated optimum market price.

20. The system of claim 14 further comprising:
means for updating the current market price for each flight inventory resource stored in the central information repository; and
means for receiving a request to purchase a flight inventory resource at the calculated optimal market value price.

21. The system of claim 20, wherein the means for updating the current market price of the flight inventory resource operates in a continuous real time nested environment.

22. The system of claim 20, wherein the means for updating the current market price of the flight inventory resource operates periodically as part of a batch cycle.

* * * * *